(No Model.)
C. F. STEELE & A. J. WHITE.
BICYCLE BRAKE.
No. 588,538. Patented Aug. 17, 1897.
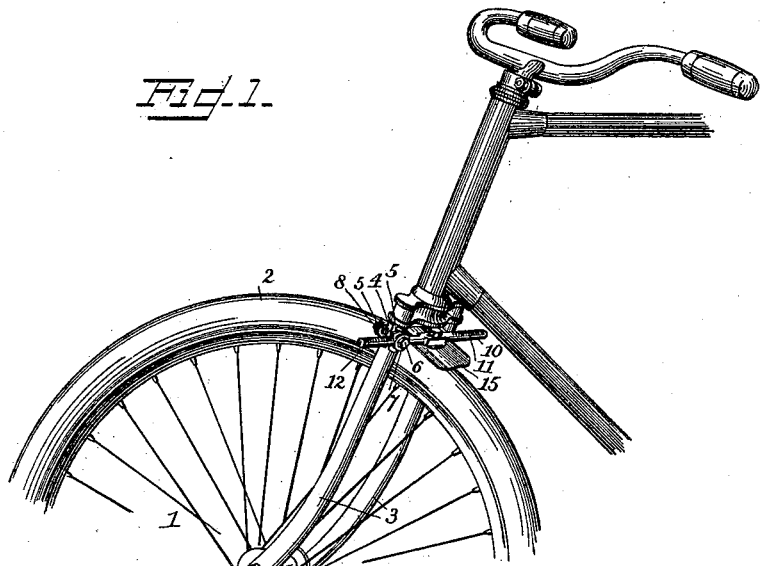
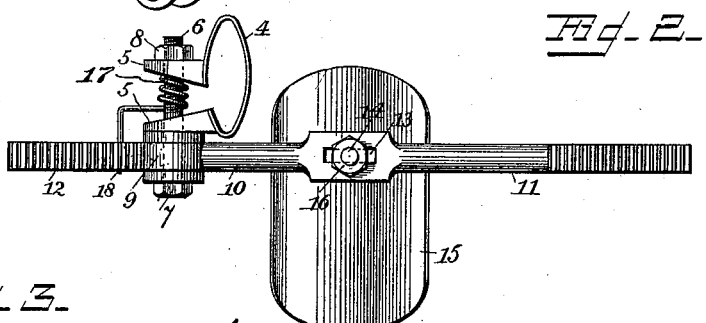
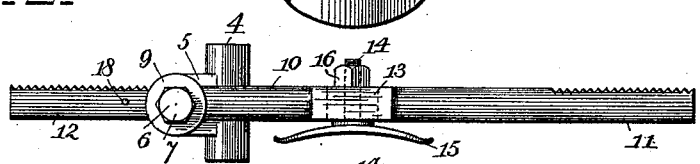
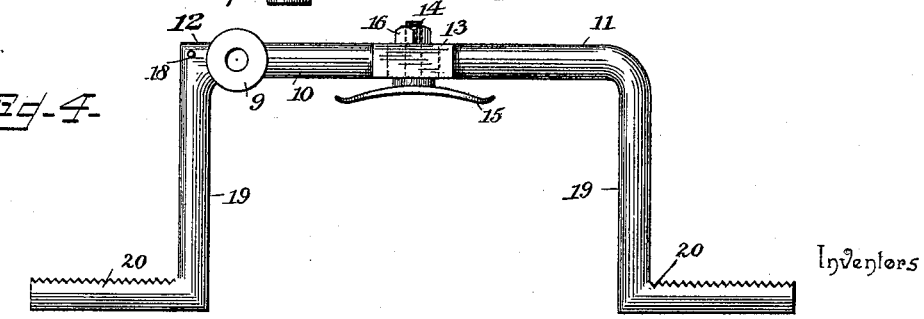
Witnesses
Chas H. Durand
J. S. Caplinger
By their Attorneys,
C. A. Snow & Co.
Inventors
Charley F. Steele and
Andrew J. White

UNITED STATES PATENT OFFICE.

CHARLEY F. STEELE AND ANDREW J. WHITE, OF SANDY LAKE, PENNSYLVANIA.

BICYCLE-BRAKE.

SPECIFICATION forming part of Letters Patent No. 588,538, dated August 17, 1897.

Application filed March 5, 1897. Serial No. 626,030. (No model.)

*To all whom it may concern:*

Be it known that we, CHARLEY F. STEELE and ANDREW J. WHITE, citizens of the United States, residing at Sandy Lake, in the county of Mercer and State of Pennsylvania, have invented a new and useful Bicycle-Brake, of which the following is a specification.

This invention relates to certain improvements in bicycle-brakes, and more especially such brakes as are designed to be operated by the feet of the rider; and the object of the invention is to provide a brake of this character of a simple and inexpensive construction which shall be light and strong and which shall be adapted for use both as a brake and as a foot-rest for the rider, taking the place of the coasters ordinarily employed.

The invention consists in a brake comprising a brake-lever having means for pivotally mounting it adjacent to one of the forks of the bicycle and provided with a brake-shoe to engage the wheel-tire, the opposite ends of said lever projecting in opposite directions beyond the forks to form coasters to receive the feet of the rider, and a spring to hold the brake-lever with its shoe normally out of engagement with the wheel-tire.

The invention also contemplates certain novel features of the construction, combination, and arrangement of the various parts of the improved brake, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate our invention, Figure 1 is a perspective view showing the front forks of a bicycle with our improved foot-brake in position thereon. Fig. 2 is a plan view of the brake detached and drawn to an enlarged scale, and Fig. 3 is a face view of the same.
Fig. 4 is a face view showing a modified form of the improved brake especially designed for use upon drop-frame bicycles.

Referring first to Figs. 1, 2, and 3, 1 indicates the front wheel of the bicycle, provided with a tire 2 and mounted in the forks 3 in the usual way, and 4 indicates a metal band or strip adapted to be passed around one of the forks 3, being provided at its opposite ends with perforated lugs 5 5, projecting at angles from it and adapted for the passage of a bolt 6, having at one end a head 7 and at its opposite end screw-threads to receive a nut 8, by which means the band 4 is adapted to be clamped upon the fork 3 of the bicycle adjacent to the upper part of the wheel 1, as indicated in Fig. 1.

The bolt 6 serves not merely for the clamping of the band 4 upon the fork of the bicycle, but also acts as a pivot-pin or fulcrum for the brake-lever 10, for which purpose said bolt is made of sufficient length to extend through a perforated boss 9, formed upon said lever 10, as clearly shown in Fig. 2, so that the brake-lever 10 is pivotally held or fulcrumed upon the bolt 6 between the head 7 thereof and the adjacent bent end portion 5 of the clip or band 4.

The arm 11 of the brake-lever 10 is made of greater length than the arm 12 of said lever, and is arranged when the clip 4 is in place on the fork of the bicycle to extend across the wheel-tire 2 and project beyond the opposite fork 3 of the bicycle in position to receive the foot of the rider, and the extremity of each of the end portions 11 and 12 of the brake-lever is provided with a roughened or serrated surface to prevent the feet from slipping thereon.

The brake-lever 10 is formed at about its central part with a thickened portion, wherein is formed a slot 13, extending longitudinally of the lever and adapted for the passage of a shank 14, projecting upwardly from the central part of the brake-shoe 15, and provided at its upper end with screw-threads to receive a nut 16, by means of which the brake-shoe is held in place to the brake-lever. In this way it will be seen that the brake-shoe is permitted to be adjusted along the brake-lever, so as to stand in proper position between the forks of the bicycle to engage the wheel-tire, this construction permitting the brake to be applied to bicycles the forks of which are differently spaced.

In order to hold the brake-shoe 15 out of engagement with the wheel-tire 2, a spring is employed, said spring being, as shown at 17 in the drawings, coiled on that portion of the bolt 6 between the lugs 5 upon the ends of the band 4 and having one end engaged with one of said lugs and its opposite end engaged, as indicated at 18, with the short arm 12 of the brake-lever, so as to hold said arm normally depressed and the longer arm 11, whereon the brake-shoe is carried, raised.

The improved brake constructed as above described is extremely simple and inexpensive, and is, moreover, very powerful, the increased length of the arm 11 of the brake-lever increasing the leverage exerted by the foot of the rider very considerably. Moreover, the device is of a light and durable construction and permits the coasters ordinarily employed to be removed from the forks, the projecting ends of the brake-lever serving in lieu thereof.

The construction shown in Fig. 4 is very similar to that above described, with the exception that it is designed especially for use on drop-frame bicycles, the saddles of which are usually lower than those of the diamond pattern. In this form of the device the ends of the brake-lever are bent down, as indicated at 19, so as to extend down along the forks when the brake is in position for use, and the lower ends of said downwardly-bent portions 19 are carried outward, as shown at 20, in opposite directions, and are serrated or roughened upon their upper surfaces to form foot-rests or coasters.

Having thus described our invention, we claim—

1. A bicycle-brake comprising a brake-lever having means to pivot it adjacent to one side of the wheel, said lever being adapted to extend across the wheel-tire and being provided with a brake-shoe adjustable longitudinally along it, and having means for securing it in position on said lever, substantially as set forth.

2. A bicycle-brake comprising a brake-lever having means to pivot it adjacent to one side of the wheel, said lever being adapted to extend across the tire of the wheel and being provided with a longitudinal slot, and a brake-shoe to engage the wheel-tire provided with a shank to play along said slot, and having means to lock it in position on the brake-lever, substantially as set forth.

3. In a bicycle-brake, a brake-lever having means to pivot it adjacent to one side of the wheel, said lever being adapted to extend across the wheel-tire, and a brake-shoe adjustable longitudinally along it and provided with means for securing it in an adjusted position, and said lever having its end portions bent to extend down along the forks, thence outwardly in opposite directions, substantially as specified.

In testimony that we claim the foregoing as our own we have hereto affixed our signatures in the presence of two witnesses.

CHARLEY F. STEELE.
ANDREW J. WHITE.

Witnesses:
J. D. BAILEY,
F. P. CRAIG.